United States Patent [19]

Ashworth

[11] 4,164,079
[45] Aug. 14, 1979

[54] SEAT CUSHION TO PROVIDE REALISTIC ACCELERATION CUES TO AIRCRAFT SIMULATOR PILOT

[75] Inventor: Billy R. Ashworth, Newport News, Va.

[73] Assignee: The United States of America as represented by the Administrator of the National Aeronautics and Space Administration, Washington, D.C.

[21] Appl. No.: 928,131

[22] Filed: Jul. 26, 1978

Related U.S. Application Data

[63] Continuation of Ser. No. 829,314, Aug. 31, 1977, abandoned.

[51] Int. Cl.² ............................................. G09B 9/08
[52] U.S. Cl. .................................... 35/12 E; 35/12 H
[58] Field of Search ................... 35/12 E, 12 F, 12 H, 35/12 R; 128/33

[56] References Cited

U.S. PATENT DOCUMENTS

| | | | |
|---|---|---|---|
| 3,097,436 | 7/1963 | Gaucher | 35/12 E |
| 3,270,440 | 9/1966 | Radosevic | 35/12 E |
| 3,300,878 | 1/1967 | Butcher et al. | 35/12 E |
| 3,309,795 | 3/1967 | Helmore | 35/12 E |
| 3,983,640 | 10/1976 | Cardullo et al. | 35/12 E |
| 4,059,909 | 11/1977 | Kron | 35/12 E |

FOREIGN PATENT DOCUMENTS 1405333  9/1975  United Kingdom .................... 35/12 E

*Primary Examiner*—Vance Y. Hum
*Attorney, Agent, or Firm*—William H. King; John R. Manning; Howard J. Osborn

[57] ABSTRACT

A seat cushion for providing realistic acceleration cues to an aircraft simulator pilot. A plurality of contiguous seat cushion compartments with each including an air cell with a non-compressible surface underneath the air cell are provided with apparatus for separately controlling the pressure in the air cells. Apparatus are provided for initially controlling the air pressure in the air cells to allow the two main support areas, the tuberosities, of the simulator pilot to touch the non-compressible surface and thus begin to compress the flesh near these areas. Thereafter during a simulated flight apparatus are provided for controlling the air pressure in the cells to simulate the events that occur in a seat cushion during actual flight.

3 Claims, 7 Drawing Figures

SEAT CUSHION TO PROVIDE REALISTIC ACCELERATION CUES TO AIRCRAFT SIMULATOR PILOT

ORIGIN OF THE INVENTION

The invention described herein was made by an employee of the United States Government and may be manufactured and used by or for the Government for governmental purposes without the payment of any royalties thereon or therefor.

This is a continuation, of application Ser. No. 829,314 filed Aug. 31, 1977, now abandoned.

BACKGROUND OF THE INVENTION

The invention relates generally to aircraft simulators and more specifically concerns a seat cushion for providing realistic acceleration cues to aircraft simulator pilots.

In the control of an aircraft, the kinesthetic cues or (seat-of-the-pants) feel provide important information to the pilot concerning the aircraft's dynamic state. Pilots sense such kinesthetic cues as buffet, control forces, and linear and angular accelerations. One of the most important of the acceleration cues is the normal acceleration. Under positive normal acceleration, the pilot is subjected to an increase in weight for each part of his body. This results in such things as the blood-pooling in lower portions of the body and a reduced blood flow to the head which eventually results in tunnel vision and blackout. The increased body weight also causes increased pressure on the "seat-of-the-pants" as the seat cushion padding becomes fully compressed and no longer conforms to the pilot's buttocks. This causes a greater portion of the pilot's weight to be borne by the area around the tuberosities (the two bones which protrude furthest into the buttocks) and thus a change in the pressure distribution on the buttocks.

Numerous seat cushion designs for simulated acceleration cues have been proposed in the past. However, these previous seat cushion designs have not worked well because of their inability to make the cues feel realistic to the pilot and because of their inability to control the air pressure with sufficient response time and smoothness to adequately drive the seat cushions. It is therefore the primary purpose of this invention to provide a seat cushion design that will provide realistic simulated acceleration cues.

Another object of the invention is to provide air pressure controllers for seat cushion designs with sufficient response time and smoothness to adequately drive the designs.

A further object of this invention is to provide a new method for imparting acceleration cues to simulator pilots.

Other objects and advantages will become apparent hereinafter in the specification and drawings.

SUMMARY OF THE INVENTION

The objective in building the simulator seat cushion that constitutes this invention is simply to reproduce as nearly as possible the same events that occur in an aircraft seat during an actual flight. In order to compress the seat padding as if the pilot weighed more, air with pressure control is used as the padding material with a non-compressible surface (wood) underneath the air cushion. The seat is initially biased (air pressure determined by the weight of the pilot) such that the air cushions conform to the pilot to support most of his weight. The initial air pressure allows the two main support areas, the tuberosities, to touch the wood surface and thus begin to compress the flesh near these areas. Thus, the bias adjusts the firmness of the seat. Then as acceleration increases (positive g) air is removed from the seat giving the effect of compressing the cushion material and causing more of the pilot's weight to be supported by the area around the tuberosities. However, some air is left in the seat to prevent the false cue of the seat falling away from the sides of the legs and buttocks. For negative g sufficient air is added to the seat to remove all contact with the wood and thus uniformly support the body weight, without becoming firm due to too much air.

This manner of seat operation (that is, reproducing the air seat actions) automatically reproduces other related pilot events such as raising or lowering the body which results in changing the eye point and the joint (hip and knees) angles.

DETAILED DESCRIPTION OF THE INVENTION

Unlike the similator designs in the past that apply pressures to different parts of a pilot's body to simulate acceleration cues, this invention is a seat cushion that simulates the events that happen in a seat cushion during actual flight to impart acceleration cues to the pilot. That is, a positive g acceleration is simulated by removing air from the seat cushion and a negative g acceleration is simulated by adding air to the seat cushion.

Figure 1:
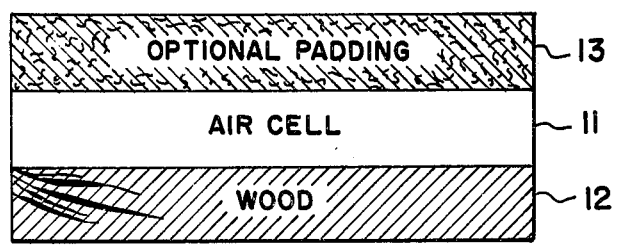
FIG. 1 is a cross section of a compartment that goes to make up the seat cushion in this invention.

A cross section of the basic design of a compartment of the seat cushion is shown in FIG. 1. A compartment consists essentially of an air cell 11 with a non-compressible surface (wood) 12 underneath the air cell. Optional padding 13 can be placed on the air cell 11. An air cell 11 is 2.54 centimeters thick to minimize "following" as the pilot shifts his weight and to increase response time by lowering the air volume required. The "following" occurs when the pilot moves in such a manner to remove a part of his buttocks area from contact with the seat cushion. The constant air pressure will cause the seat cushion to "follow" the moving buttocks area until the seat cushion reaches the limit of its excursion capability. In this seat cushion the maximum "following" will be 2.54 centimeters or less.

Figure 2:
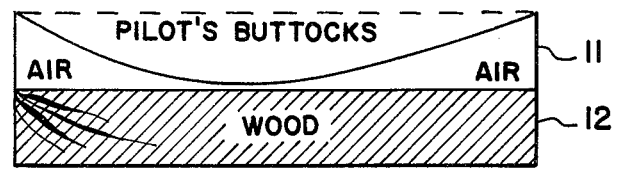
FIG. 2 is a cross section of one of the seat compartments with the pilot sitting in the seat while it is initially biased at one g.

When the simulator pilot sits in the seat cushion, the air cells are initially biased such that the seat cushion supports most of his weight as shown in FIG. 2. That is, the cells are initially pressurized to support most of the weight of the pilot. The initial air pressure allows the two main supportive areas, the tuberosities, to touch the wood surface and thus begin to compress the flesh near these areas. Thus the bias adjusts the firmness of the seat cushion.

Figure 3:
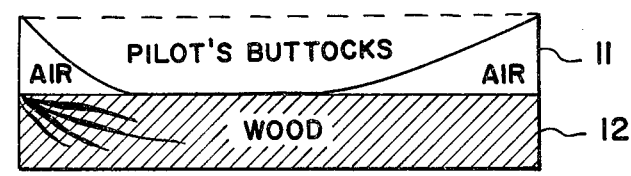
FIG. 3 is a cross section of a compartment of the seat cushion with the pilot in the seat at a positive g acceleration.

Then as acceleration increases (positive g) air is removed from the seat cushion as shown in FIG. 3 giving the effect of compressing the cushion material and causing more of the pilot's weight to be supported by the area around the tuberosities. However, some air is left in the seat cushion to prevent the false cue of the most falling away from the sides of the legs and buttocks. For a negative acceleration sufficient air is added to the seat to remove all contact with the wood and thus uniformly support the pilot's weight without becoming firm due to too much air.

Figure 4:
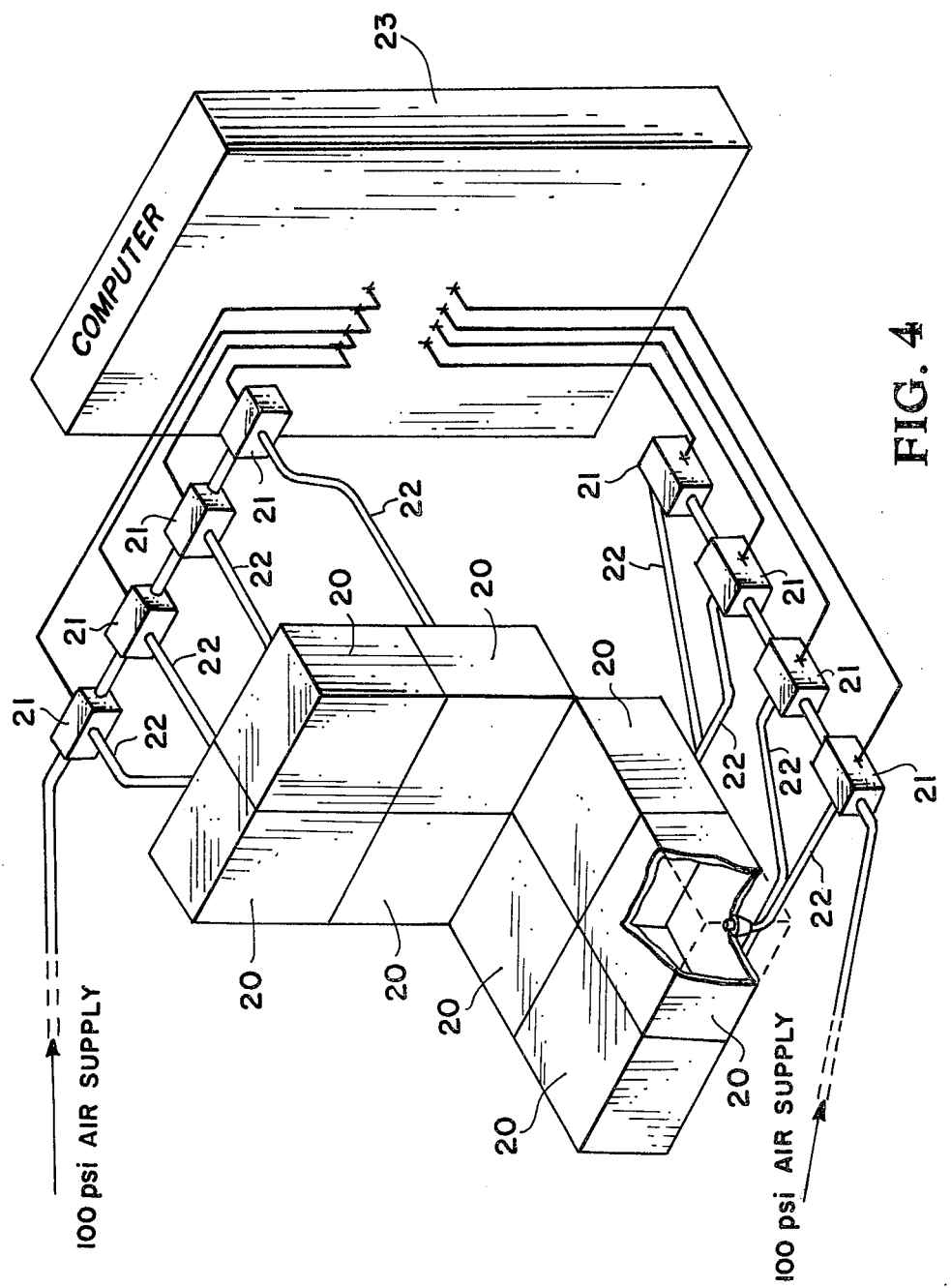
FIG. 4 is a block diagram of the seat cushion and its controls.

Turning now to the embodiment of the invention selected for illustration in FIG. 4, the seat cushion and a back cushion are each made up of four contiguous compartments 20. The pressure to each of the compartments 20 is controlled from a 100 psi air supply by means of a servo controller 21. The range of pressure in each compartment is 0–2 psi. The air pressure from each of the servo controllers 21 to the corresponding compartment 20 is through a ¾ inch air line 22. The command signals to each of the servo controllers 21 is supplied by a computer 23. These signals represent the events in a seat cushion during an actual flight.

Figure 5:
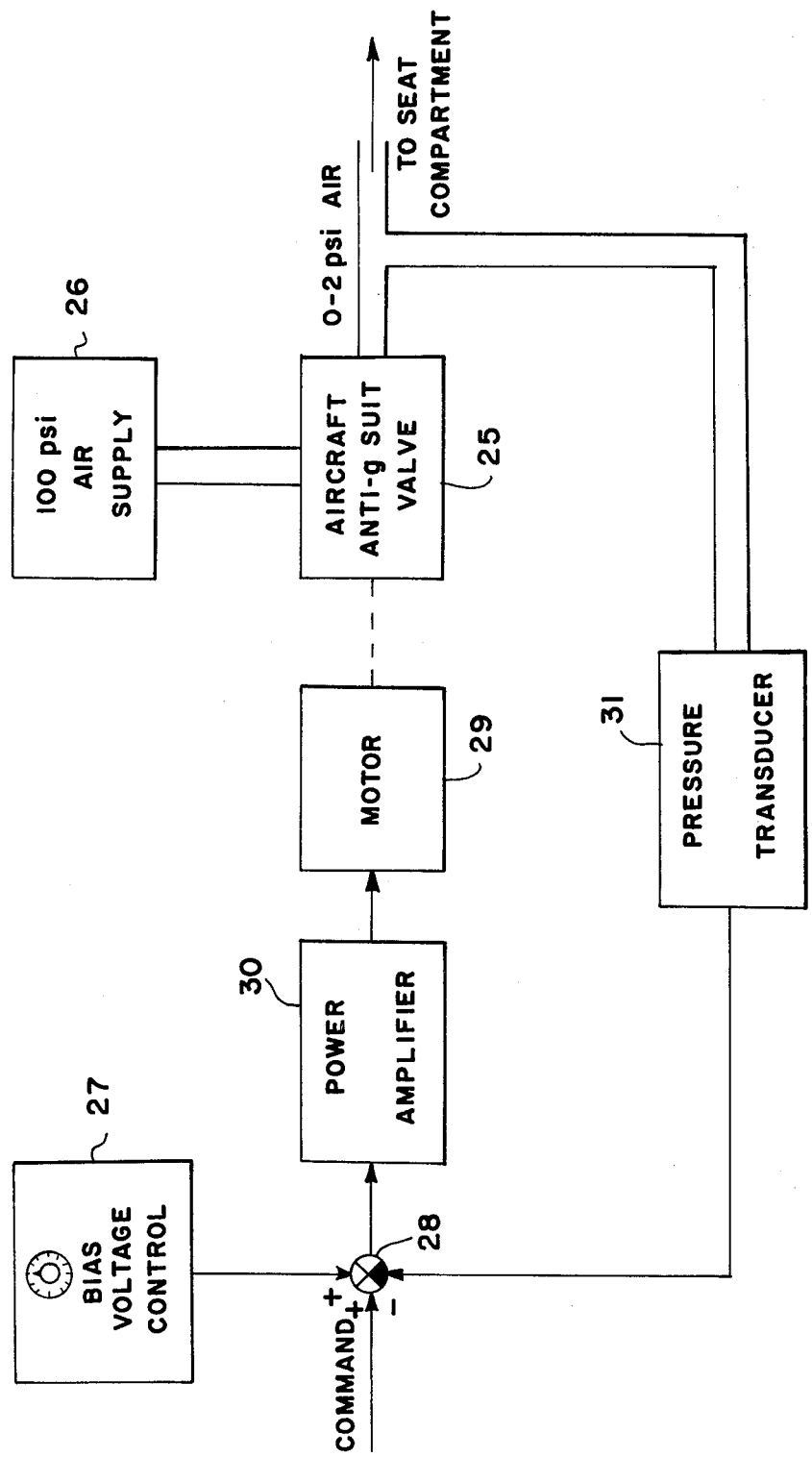
FIG. 5 is a block diagram of a servo controller that controls the air pressure in one of the seat compartments.

The inherent design of the seat cushion requires precise and responsive control of the air pressure in each compartment. Therefore, the servo controller utilizes pressure feedback as shown in FIG. 5. A valve 25 controls the pressure from a 100 psi air supply 26 to the seat compartment. The air control valve used is a standard aircraft anti-g suit valve such as the valve disclosed in U.S. Pat. No. 3,300,878 with the normal activating slug replaced by a motor 29 to provide linear actuation of the valve. The aircraft valve was chosen because it provides adequate pressurization time and more importantly, adequate bleed time without the use of other devices such as booster relays which tend to degrade the pressurization time. The valve has a nonlinear relationship between the input displacement and the output pressure; however, the pressure feedback provides linear response. The initial air pressure for a seat compartment is set by means of a bias voltage control 27 which supplies a voltage to a summing device 28 the output of which is supplied through a power amplifier 30 to motor 29. This initial pressure as discussed above is dependent on the weight of the pilot. A pressure transducer 31 is located in the seat compartment to produce a negative voltage proportional to the air pressure. This negative voltage provides a negative feedback which is applied to summing device 28. The positive command signals applied to summing device 28 are supplied by the computer 23.

Figure 6:
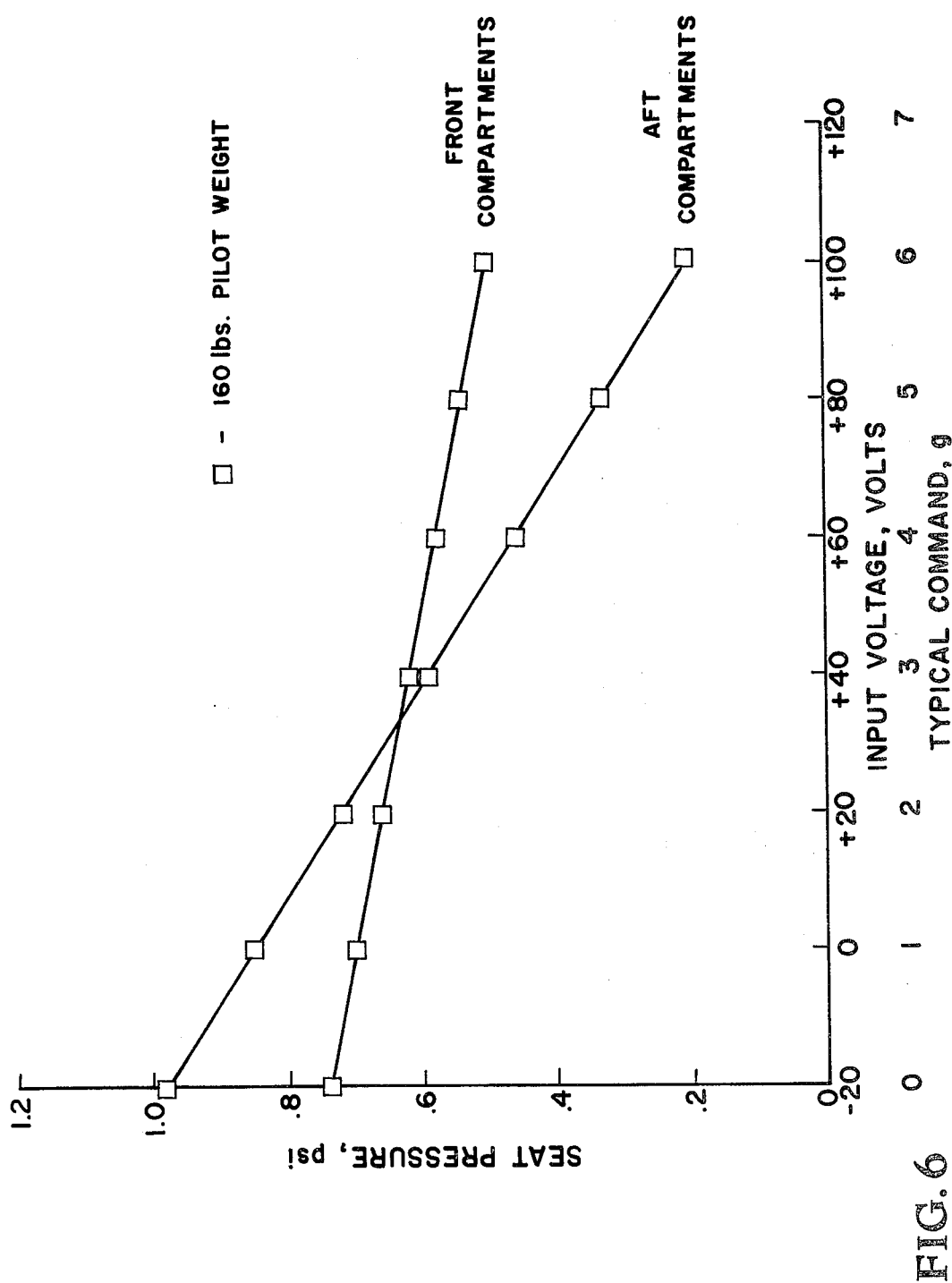
FIG. 6 is a graph of seat pressure versus normal acceleration for both the front and aft seat compartments.

A complete seat was installed in NASA Langley Research Center's Differential Maneuvering Simulator (DMS) which is described in NASA TN-D 7304. The DMS has a wide field-of-view visual display where all servos involved in projecting the visual scene are synchronized with a 0.7 damped, 25 radius per second, second order transfer function. The seat was initially driven with normal acceleration only and the seat compartments were subjectively scaled using 6 test pilots and two engineers. The scaling (FIG. 6) was developed by the test pilots and engineers in making comparison flights in a T-38 aircraft. Note that the two forward compartments are driven over a smaller pressure range than the two rear compartments. This is due to the pilot's feet, resting on the rudder pedals, not allowing his upper leg to fall as his torso does. Also note in FIG. 6 that none of the compartments was driven to zero differential pressure in order to prevent the false cue of the seat falling away from the pilot's legs and sides of the buttocks. The scaling chosen allows maximum feel at plus 6g and 0g with the 1g neutral position biased as a function of the pilot's weight as shown in FIG. 7 to allow the pilot's tuberosities to just start to contact the hard surface as described earlier.

Figure 7:
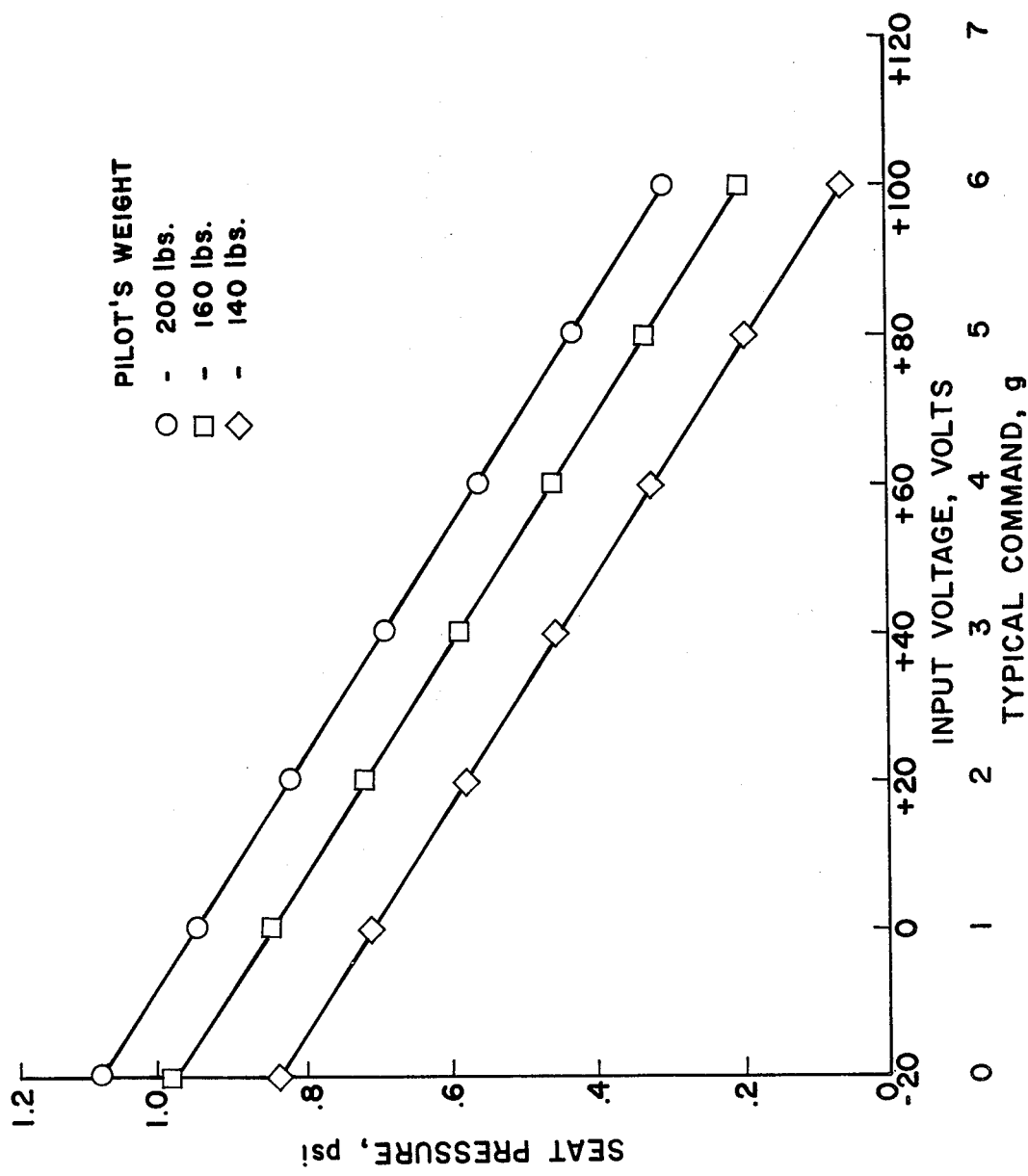
FIG. 7 is a graph of seat pressure versus normal acceleration for various pilot weights.

As can be noted by FIG. 7, the slopes of all the curves are equal. That is, regardless of the weight of the pilot the slope of his curve is the same as the slopes of the curves for pilots at all other weights. Hence, once a pilot's weight is initially set into the bias voltage controls 27 the command signals from the computer 23 determines his curve in FIG. 7. Consequently, one set of command signals from computer 23 is all that is needed for all pilots.

The advantages of this invention are that it provides realistic acceleration cues for aircraft pilots and it uses a modified aircraft valve with pressure feedback to provide responsive, smooth, and linear operation.

Even though this invention has been described as imparting normal acceleration cues to the simulator pilot, it is obvious it can be used to impart other acceleration cues to the pilot.

What is claimed is:

1. A seat cushion for providing realistic acceleration cues for an aircraft simulator pilot comprising:

a plurality of contiguous seat cushion compartments with each including an air cell having a top surface that is conformable to the pilot's buttocks and having a bottom surface in contact with a non-compressible surface;

means for initially controlling in accordance with the weight of the simulator pilot the air pressure in said air cells to allow the two main support areas, the tuberosities, of the simulator pilot to touch the noncompressible surface and thus begin to compress the flesh near these areas said means including a separate control means for each of said air cells;

each of said control means including a pressurized air supply connected to an aircraft anti-g-suit valve for controlling the air pressure in its corresponding seat cushion compartment, the normal activating slug of said aircraft anti-g-suit valve replaced by a motor to provide linear actuation of the valve, means for applying a bias voltage to said motor said bias voltage being set in accordance with weight of said pilot, a pressure transducer means for producing a voltage proportional to pressure output of said aircraft anti-g-suit valve and means for subtracting the voltage produced by said pressure transducer means from said bias voltage before it is applied to said motor; and means for controlling air pressure changes in each of said air cells to simulate the events which occur in a seat cushion during an actual flight said means including a computer means for supplying a command voltage to each of said control means said command voltage being added to its corresponding bias voltage before it is applied to its corresponding motor.

2. A seat cushion for providing realistic acceleration cues for an aircraft simulator pilot comprising:
- a plurality of contiguous seat cushion compartments with each including an air cell having a top surface that is conformable to the pilot's buttocks and having a bottom surface in contact with a noncompressible surface;
- means for controlling air pressure changes in each of said air cells to simulate the events which occur in a seat cushion during an actual flight said means including a separate control means for each of said air cells and a computer means for supplying a command voltage to each of said separate control means;
- each of said separate control means including a pressurized air supply with means for controlling the pressure from said air supply to the corresponding air cell said means for controlling the pressure to the air cell includes an aircraft anti-g-suit valve with its normal activating slug replaced by a motor to provide linear actuation of the valve, the command voltage from said computer means applied to said motor, a pressure transducer means for producing a feedback voltage proportional to the pressure applied to said air cell and means for subtracting said feedback voltage from said command voltage before it is applied to said motor.

3. A seat cushion according to claim 2 including a bias voltage control means for adding a selected constant voltage level to said command voltage before it is applied to said motor whereby the pressure in said air cell can initially be controlled in accordance with the weight of said pilot.

* * * * *